Nov. 17, 1942.     H. R. GREENLEE ET AL     2,302,312
TRANSMISSION
Filed June 25, 1941     2 Sheets-Sheet 2
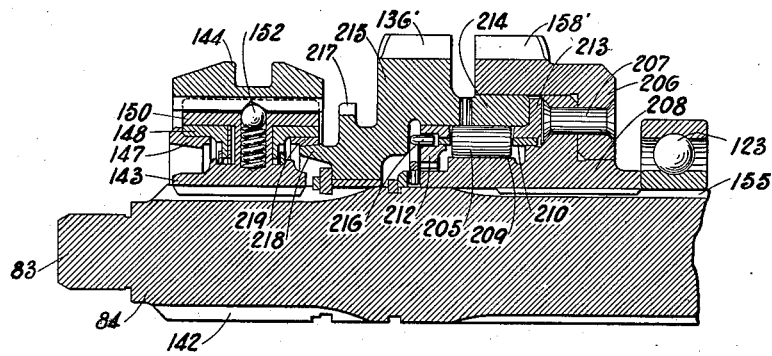
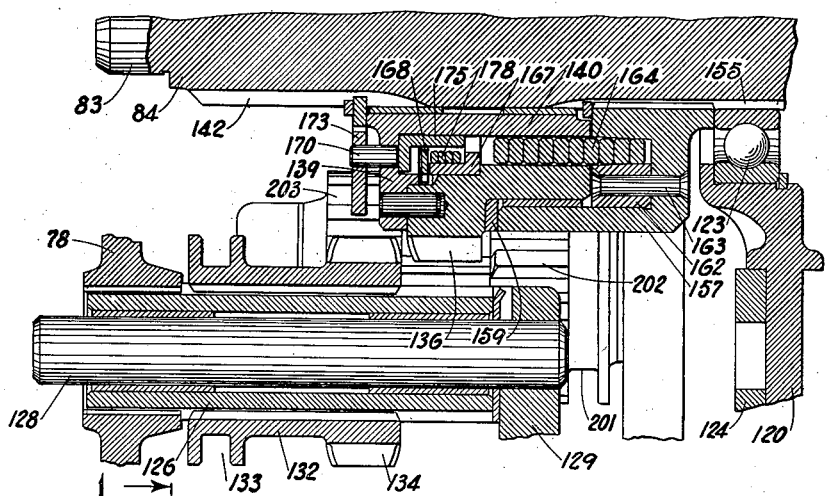
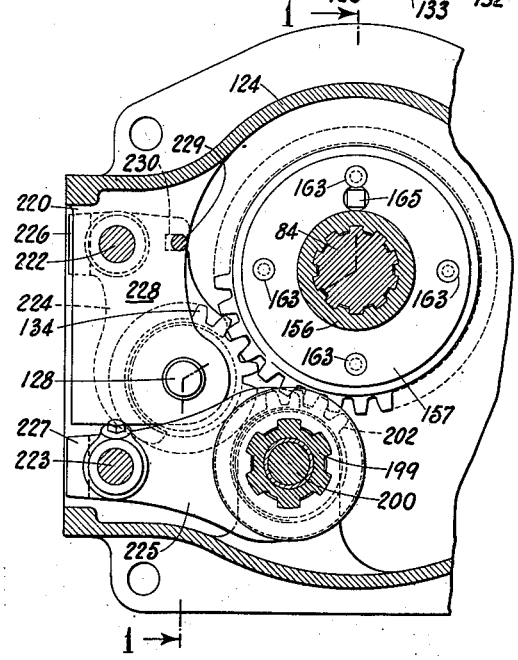
Harry R. Greenlee
Loren D. Britton
John R. Bond
INVENTORS
BY Walter E. Schirmer
ATTORNEY Patented Nov. 17, 1942

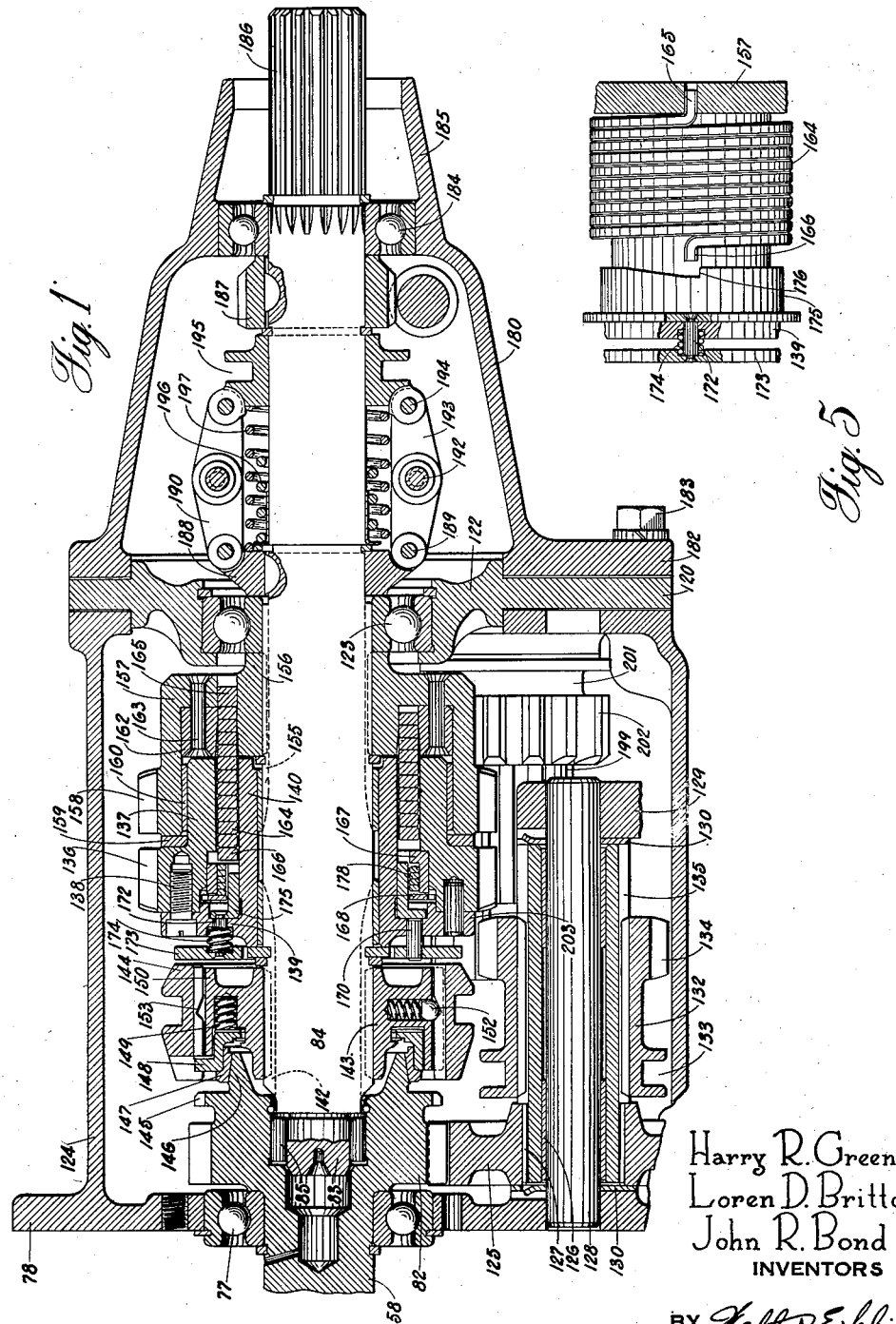

2,302,312

UNITED STATES PATENT OFFICE 2,302,312

TRANSMISSION

Harry R. Greenlee, Loren D. Britton, and John R. Bond, South Bend, Ind., assignors to The Studebaker Corporation, South Bend, Ind., a corporation of Delaware Original application December 14, 1940, Serial No. 370,114. Divided and this application June 25, 1941, Serial No. 399,578

5 Claims. (Cl. 74—368)

This invention relates to transmissions and more particularly is directed to a transmission for use on automotive vehicles for transmitting torque from the power plant of the vehicle to the driving axle.

The present application is a division of our copending application, Serial No. 370,114, filed December 14, 1940.

In the copending application referred to above we have disclosed a transmission embodying a fluid coupling to provide for smooth connection of the engine to the transmission and incorporating with the coupling an underdrive control and a two speed transmission, the planetary drive being interposed between the fluid clutch and the two speed transmission and functioning in conjunction with the transmission to provide four selective driving ratios.

This combination produces a transmission which corresponds generally with the present three speed transmission plus overdrive, it being contemplated that in the present invention the fourth speed which is a direct connection between the engine and propeller shaft will be comparable to an overdrive in that the gear ratio on the driving axle is reduced so that, in effect, the same result is attained with a direct drive as was formerly accomplished through an overdrive.

While the above mentioned copending application disclosed details of the fluid coupling of the planetary overdrive and control therefor for connecting the power of the engine to the transmission, the present invention concerns itself more particularly with the details of the transmission itself, the particular two speed transmission herein shown and described being capable of use with other types of fluid clutch and under drive mechanism and constituting in itself a novel type of transmission for use in such a vehicle power system, although it is to be understood that the transmission is equally well adapted for use with other forms of clutches and without the use of the underdrive, if desired.

It is highly desirable in a transmission of this type that overrunning of the propeller shaft with respect to the engine shaft be provided during the shifting operation so that there is no braking effect produced by the engine during the shifting operation. The elimination of this effect produces a much smoother shift as well as preventing rapid deceleration of the vehicle during the time that the accelerator pedal is raised as the shift is taking place. The present invention accomplishes this by providing such an overrunning connection. In addition, the construction is such that if the low speed gear in the transmission be shifted into meshing engagement it need not be removed from its meshing position during shifting into high speed or direct drive.

Another advantage, however, in connection with this overrunning feature is the provision of means which is automatically operable during the shifting operation and allows the use of the motor as a brake through the transmission. This is of advantage in descending hills or inclines when the braking effect of the motor can be utilized to retard acceleration of the vehicle. In a transmission in which the overrunning of the propeller shaft with respect to the engine is provided at certain speed ratios, it is also desirable that a positive reverse drive be provided and the present invention includes such means, having a gear on the reverse idler shaft of the transmission which is of the same design as the countershaft gear for producing reverse drive. This gear, in conjunction with a novel type of clutching mechanism, provides a positive reverse drive through the transmission while still allowing overrunning in any of the forward speeds. In this connection we prefer to employ a coil spring clutch of the L. G. S. type which can be energized in one direction to produce a clutching action by expansion of the coil spring, or can be energized in the opposite direction to produce clutching action by contraction of the springs. If desired, however, a differential form of overrunning type clutch may be substituted, or other types of mechanism can be employed so long as a positive reverse drive is provided.

The two speed transmission herein disclosed is of distinctly novel design and is capable of employment either with or without the planetary underdrive of the fluid coupling. The transmission is arranged with a synchronizer and toothed clutch for producing the desired connection between the drive shaft and transmission tail shaft and is provided with a splined gear on the countershaft for producing low speed drive through the transmission. This splined gear is so arranged as to remain in meshed position when the direct driving engagement is effected and consequently simplifies the shifting action and readily accommodates this transmission to an automatic control system.

In addition, the synchronizer sleeve is so arranged in the present transmission as to provide means whereby when reversely shifted it will produce a positive reverse drive or may be utilized to produce a braking action of the motor on the tail shaft of the transmission to retard the tail shaft during coasting or when descending long hills.

In a modified form of the two speed transmission we employ only five gears which will produce forward drive in either one or two speed ratios and will also produce the reverse drive.

It is contemplated within the purview of the present invention to provide suitable speed responsive or torque responsive mechanisms on the tail shaft and the transmission which, in turn, are adapted to control suitable valve or contact mechanism for automatically effecting the desired shifting of the transmission. The control mechanism, while not shown in the present application, may be of simplified form and may be either of positive pressure or vacuum actuated type.

Other objects and advantages of the present invention illustrating the simplicity of design, ease of assembly and details of construction will be more apparent from the following detailed description which, taken in conjunction with the accompanying drawings, will disclose to those skilled in the art the particular construction and operation of a preferred form of the present invention.

In the drawings:

Figure 1 is a sectional view showing one form of the two speed transmission which is driven through either a conventional clutch or the clutch of the underdrive disclosed in the above mentioned copending application;

Figure 2 is a detailed sectional view of a portion of Figure 1 modified to incorporate an overrunning clutch therein;

Figure 3 is a detailed sectional view of a further modification of Figure 1 in which one of the gears has been eliminated;

Figure 4 is an end elevational view, partly in section, showing the relative alinement of the main shaft, counter shaft and reverse idler shaft of the transmission; and Figure 5 is a top plan view, partly in section, of the clutching arrangement for actuating the coil spring clutch.

Referring now in detail to the drawings as disclosed in Figure 1, the transmission which has the drive gear thereof extending forwardly in the form of the shaft 58 is connected through either a planetary underdrive and fluid coupling or through any other clutching arrangement to the source of power of the vehicle. The flanged end 78 of the transmission housing has formed therein a ball adapted to receive the bearings 77 for supporting the rear end of the shaft 58. At its rear end within the housing of the transmission the shaft is radially energized to provide the drive gear portion 82 and is axially recessed to receive the pilot end 83 of the main transmission shaft 84 which is journaled therein by means of the roller bearings 85.

Considering now the transmission housing structure as shown in Figure 1, the housing 78 of this mechanism is closed at its rear end by a transverse member 120 which has an offset bearing portion 122 adapted to receive the ball bearing assembly 123 supporting the tail shaft 84 of the transmission. The other end of this shaft, as previously described, is piloted by the bearings 85 in the end of the drive shaft 58. The drive gear 82 of the shaft 58 has constant meshing engagement within the housing 124 with a gear 125 mounted on the sleeve 126 by means of splines 127. The sleeve 126 is suitably supported upon bushings or the like on a counter shaft 128 supported at one end in the end 78 of the housing 124 and at the other end in a transverse web 129. Suitable thrust washers 130 at opposite ends of the sleeve retain it in position. Also splined upon the sleeve 126 is an axially movable gear member 132 having at one end thereof the annular groove or yoke collar 133 for receiving the shifting fork and having at its opposite end the reverse speed idler gear or low speed gear 134 of the transmission. The member 132 is adapted to be shifted axially on the splines 135 of the sleeve 126 and when shifted axially to the right of the position shown in Figure 1 is adapted to have meshing engagement with the teeth 136 of the gear 137 which is suitably mounted by means of studs 138 upon the radial flange 139 of a hub member 140 suitably supported for rotation by means of bushings upon the shaft 84. Between the gear 137 and the gear 82 the shaft 84 is splined as indicated at 142 to receive the splined hub portion 143 of a synchronizing mechanism including an outer synchronizing sleeve 144 and internally splined to the hub 143 and adapted to have axial sliding movement and coupling engagement with the clutch teeth 145 of the gear 82 whereby the sleeve 144 clutches between the gear 82 and the hub portion 143 to directly couple the shafts 58 and 84 for driving engagement.

The enlarged end of the shaft 58 is also provided with a friction surface 146 adapted to be engaged by the friction cone 147 carried by the synchronizing portion 148 of the clutch 144. The ring or cone is normally urged into frictional engagement with the surface 146 by means of axially directed springs 149 carried within the hub member and bearing against the inner flanged end of the member 148. This particular synchronizing structure is similar to that described in the copending application of O. K. Butzbach, Serial No. 343,938, filed July 5, 1940. The toothed portion 150 of the hub member 143 has formed therein at circumferentially spaced points the poppet balls 152 which are adapted to engage in suitable recesses 153 formed in the internal splines of the sleeve 144 to act as detents therefor whereby initial shifting movement of the member 144 will carry the hub 143 axially to the left to bring the friction surfaces 146 and 147 into positive engagement for synchronizing the speeds of the shafts 84 and 58 prior to moving the clutch sleeve 144 into clutching engagement.

Suitably mounted upon the splines 155 of the shaft 84 is the hub portion 156 of a gear member 157 which has external gear teeth 158 formed adjacent the gear teeth 136 and spaced therefrom by means of the thrust washer 159. The external axially directed portion of the member 157 has bearing engagement on the cylindrical portion 137 of the gear 136 by means of a bushing 160. Mounted within the annular space between the end of the cylindrical portion 137 of the gear 136 and the end flange of the member 157 is an annular ring 162 which is secured to the member 157 by means of the rivets 163. This member forms an internal cylindrical bearing surface to be acted upon by the coils of the helical spring clutch 164. This clutch 164 is anchored at one end as indicated at 165 in Figures 1 and 5 in the end portion of the member 157 and extends axially between the hub 156 and the member 157 and the ring 162 and thence into the annular space between the sleeve 140 of the member 139 and the inner surface or annular portion of the gear member 137. At its inner end the coil spring member is provided with a normally directed lip 166 which is adapted to be engaged by the radially inturned end of a sleeve member 167 carried within the gear member 137 and retained in position therein by means of the snap ring 168.

Mounted upon suitable dowels 170 and studs 172 carried by the flanged portion 139 of the member 140 is a radial plate member 173 which is normally spring-pressed toward the synchronizer sleeve 144 by means of springs 174. The inner end of the studs 172 have secured thereto the annular sleeve member 175 which at its inner end is provided with the recessed or notched portion 176 shown in Figure 5. When the synchronizer sleeve 144 is shifted to the right, as viewed in Figure 1, it abuts against the plate 173 thereby urging the sleeve 175 axially to the right to move the notched portion 176 thereof into engagement with the end 166 of the spring 164. Under such conditions, if the tail shaft 84 is rotating at a faster speed than the engine with the first speed gear 134 in meshing engagement with the gear 136 there will be a difference in relative rotation of the member 157 and the gear member 137 which, in turn, results in a difference in rotation between the member 157 and the member 140 secured to the gear member and carrying the sleeve 175. This results in contraction of the spring coils thereby locking the spring 164 to the external annular surface of the member 140 and providing positive clutching engagement between the member 157 and the member 140 to produce a braking action when, and if, desired so that the engine acts as a brake upon the tail shaft.

With the plate member 173 in the position shown in Figure 1 there is no tendency to contract the coils of the spring 164 and, consequently, these springs will remain in a normal intermediate position in which the member 137 will not be clutched with the member 157. However, when the first speed gear 134 is moved into meshing engagement with the gear teeth 136 and is driven by the shaft 58 it will tend to rotate the gear 136 at a speed greater than the speed of the member 157 since this is the low speed drive through the transmission. As a result the teaser spring 178 will act through the member 167 to energize the coils of the spring 164 in the opposite direction expanding the same to produce a clutching action between the internal annular surface of the gear member 137 and the internal annular surface of the ring 162 secured to the member 157. As a result, as long as the member 137 tends to overdrive the member 157 there will be a positive clutching action caused by expansion of the spring coils and a positive drive to the shaft through the splines 155 will be produced.

However, the shaft 84 tends to overrun with respect to the driving gears 134 and 136, during release of the accelerator prior to shifting. The spring 164 then returns to a neutral position allowing the shaft 84 to overrun relative to the gear 136 so that there is no momentary braking action of the engine during this interval. This overrunning action will be effected as long as the first speed gear is in engaged position with the gear 136 regardless of whether the direct or underdrive is provided through the planetary.

The housing 124 has secured to the rear end thereof the conical housing 180 having a flange 182 secured through the intermediate member 120 to the end of the housing 124 by means of studs 183. The tail shaft 84 extends through the housing 180 and is suitably supported adjacent its rear end by means of the bearing assembly 184 adjacent the rear end 185 of the housing 180. The projecting end of the shaft 84 indicated at 186 is splined to receive the companion flange of a universal joint assembly which connects the tail shaft to the propeller shaft. Disposed within the housing 180 the shaft 84 is provided with a speedometer gear 187 of conventional design and is also provided with a governor mechanism comprising a fixed portion 188 keyed to the shaft 84 and carrying the opposite pivots 189 which through the links 190 are connected to the toggle joints 192 acting as the centrifugally movable members of a governor mechanism connected through the opposite pair of links 193 to pivots 194 carried on a yoke collar 195. It will be apparent that as the speed or rotation of the shaft 84 increases the toggle joints 192 move radially outwardly under the influence of centrifugal force, thereby tending to move the yoke 195 axially to the left along the shaft 84. This results in compression of the double coil springs 196 and 197 which resist this movement and which can be adjusted to control the point at which the yoke collar 195 will move sufficiently to actuate suitable valving mechanism for controlling the shifting within the transmission.

Referring again to the two speed transmission of Figure 1, an idler shaft 200, shown in Figure 4, is provided within the transmission housing and carries thereon an externally splined sleeve 199 slidably receiving the gear 202 which has a yoke portion 201 for receiving a shift fork. The gear 202 is an idler gear carried on the shaft 200 and when moved to the left from the position shown in Figure 1, is adapted to have meshing engagement with the gear teeth 158. The opposite end of the shaft sleeve 199 has a fixed gear 203 adapted to be driven by the gear 134 when in the position shown in Figure 1, whereby the gear 157 is driven in a reverse direction when the gear 202 is shifted to the left from the position shown in Figure 1 into meshing engagement with the gear 158. This results in providing reverse drive through the transmission to the tail shaft as indicated at 155. This reverse drive is independent of the spring clutch and provides a positive reverse from the gear 134 to the gear 203 and thence through the gear 202 to the gear 158. Thus there is no overrunning or free wheeling in reverse drive.

In the form of the invention shown in Figure 2 the spring clutch is eliminated and a more or less conventional type of overrunning clutch indicated at 205 is inserted between the gear 136' and the gear 158'. The gear 158' in this form of the invention is provided with a radially flanged end portion 206 which is rigidly secured as at 207 to a hub member 208 mounted on the splines 155 of the tail shaft 84. The member 208 also has a clutch journal surface 209 forming the inner race for the overruning clutch 205. The overrunning clutch 205 is mounted in a retainer 210 carried within and preferably cast integrally with a bearing support 212 which at one end forms a thrust flange 213 between the flanged portion of the hub member 208 and the cylindrical extension 214 of the gear member 215 carrying the gear teeth 136'. The retaining member 212 is locked by means of splines or the like for limited rotation relative to the hub member 208 and a suitable coil spring 216 normally urges the clutch assembly into inoperative position.

The gear member 215 is provided with a clutch toothed portion 217 adapted to be engaged by the synchronizer sleeve 144 having the internal teeth mounted on the external toothed portion of the synchronizer hub 143 mounted on the splines 142. Disposed axially upon the clutch teeth 217 the gear member 215 has a friction clutch surface 218 adapted to be engaged by a synchronizing cone 219 carried by the synchronizer hub 143. It will thus be apparent that the synchronizing sleeve 144 can be shifted to the right as viewed in Figure 2 to provide a positive clutch between the shaft 84 and the gear member 215. Thus a positive low speed drive can be provided, if desired. However, in normal operation the gear 134 on the countershaft 128 will drive the gear 136' which through the overrunning clutch 205 will pick up and drive the hub member 208 for driving the tail shaft.

Whenever the tail shaft begins to rotate faster than the gear 136' the clutch will function to release engagement therebetween and allow a free wheeling action. The reverse gearing is operated in this form of the invention in the same manner as described in connection with Figure 1. The positive clutch between the gear 136' and the shaft 84 is for the purpose of being able to crank the motor by moving the vehicle and provides a construction corresponding to that shown in the copending Greenlee application, Serial No. 358,393, filed September 26, 1940.

In the construction shown in Figure 3 the mechanism is substantially the same as shown in in Figure 1 with the exception that the gear teeth 158 have been removed from the member 157. This then requires that the reverse slider 202 be moved to the left so that it can be moved into clutching engagement with the gear 136 instead of within the gear 158. The spring clutch arrangement functions in exactly the same manner as previously described, allowing the gear 136 to couple to the shaft through the member 157 by expansion of the clutch coils and to be uncoupled from the member 157 when this member tends to overrun the gear 136. The advantage of such a construction is the elimination of the gear teeth 158 thereby reducing materially the cost of the construction and the shortening of the shaft portions on which the reverse gears 202 and 203 are mounted. It will be apparent that whenever the gear 134 is shifted into meshing engagement with the gear 136 in any of the forms of the invention shown in Figures 1 to 3, the lay shaft 200 will be uncoupled from any gearing engagement and, consequently, will not be rotated. This is of distinct advantage. One of the distinctions between the construction shown in Figure 1 and that shown in Figure 3 is the fact that the reverse drive in the latter form of the invention is coupled to the tail shaft 84 through the spring clutch 164, this clutch being reversely energized under such conditions to provide the coupling engagement.

The shifting mechanism for the gears 134 and 202 is shown somewhat diagrammatically in Figure 4. It will be seen that the transmission housing 124 is provided with a side opening indicated at 220. Disposed in vertically spaced arrangement within this opening are the shift rails 222 and 223 mounted in suitable journals formed in the transmission housing. Each of the shift rails is provided with a shifter fork indicated at 224 and 225 having projecting notched lug portions 226 and 227, respectively, adapted to be engaged by any suitable actuating means for shifting the fork and rail axially to move the respective gears into the desired position. The shifter forks 224 and 225 have yoke portions engaged in the corresponding collars 201 and 133 of the respective gears. Preferably the transverse web or partition 228 formed in the transmission housing for supporting the lay shaft 200 is provided with a suitable pin member 229 extending longitudinally of the transmission and providing a support for the notched portion 230 of the shifter fork 224 to maintain it in position without imposing any radial stress upon the yoke portion 201 of the gear 202. The particular mechanism by which the forks 224 and 225 are shifted forms no part of the present invention but suffice it to say that the actuating means is hydraulically controlled by means of suitable valves and pistons which are operated in accordance with the governor mechanism shown in Figure 1, so far as shifting the clutch sleeve 144 is concerned. So far as the reverse idler gear is concerned, the shifting of this gear can be manually controlled by a simple lever which moves the gear into meshing engagement with either the gear 136 or the gear 158 and when in its opposite position shifts the gear 202 into neutral position.

If it is desired to start the vehicle off in its lowest speed ratio the gear 134 in the transmission is shifted into meshing engagement with the gear 136 and is allowed to remain in this position throughout the normal forward driving range. This shift can be controlled by a small lever on the steering column which merely is shifted in one direction to effect a forward drive and in the opposite direction is operable to shift the gear 202 into engagement with the gear 158. The remainder of the drive can be automatic in operation. The engine then drives the shaft 58 which through the counter shaft 135 and the gear 134 drives the gear 136 in the transmission. This gear is free to rotate relative to the shaft 84 but as it starts to overrun with respect to the gear 157 the spring 164 is energized, thereby effecting a friction clutching engagement between the gears 136 and 157 so that the drive is transmitted to the main shaft 84.

As the speed of this shaft increases, the governor mechanism in the housing 180 begins to function, moving the shift collar 195 to the left. This, in turn, operates a suitable valve mechanism in a fluid controlled circuit for shifting the synchronizer sleeve 144 into engagement with the clutch teeth 145 of the gear 82, thereby producing a direct drive between the shafts 58 and 84. This direct drive can be effected while the gear 134 remains in meshing engagement with the gear 136 since the gear 137 is free to overrun relative to the gear 156.

It is to be understood that the particular control means and the particular sequence of the drives can be varied as desired. For example, the drive can be an underdrive through the planetary and a reduction through the transmission then a shift to a direct drive through the planetary with a reduction through the transmission and a subsequent direct drive eliminating the reduction change in the transmission. Optionally, the drives could be arranged to provide an underdrive through the planetary with a reduction through the transmission, then a shift to direct drive in the transmission and a final shift into direct drive through the planetary. Thus, by properly arranging the control system the present construction is capable of a combination of different driving ratios, available for use and controlled in accordance with the torque and speed conditions encountered.

If it is desired to effect reverse drive, the gear 134 while in neutral is in constant mesh with the gear 203 of lay shaft 200. The gear 202 is then shifted into engagement with the gear 158 whereby upon actuation of the clutch 50 reverse drive can be effected to the gear 157 and thence to the shaft 84 either in underdrive or direct drive through the planetary although preferably this will be arranged to operate through the underdrive of the planetary.

If it is desired to use the motor as a brake, as, for example, coming down hill, the synchronizer sleeve 144 can be shifted rearwardly to engage the plate 173 which, in turn, through the sleeve 175 energizes the spring 164 in a reverse direction thereby coupling the gear 157 to the gear 136 and consequently coupling the shaft 84 back through the reduction gearing to the engine through the fluid coupling to provide an engine brake for retarding the speed of the vehicle when coasting. This can be either manually or automatically controlled.

The forms of the invention shown in Figures 2 and 3 will provide similar operating sequences, the only difference between Figure 1 and Figure 2 being the use of an overrunning clutch 205 in place of the spring 164 and the provision of means for directly coupling the gear 136' to the shaft 84 in place of using the plate 173 and reversing the energization of the spring 164.

In Figure 3 a construction substantially identical with Figure 1 is provided, except that the teeth 158 of the member 157 are eliminated and the reverse gear 202 is adapted to be shifted directly into engagement with the gear 136. In its other respects, this construction is the same in so far as the operating sequences are concerned.

It is therefore believed apparent that we have provided a novel type of transmission which is capable of automatic operation and which provides all the various driving ratios necessary to utilize the transmission under various conditions.

We are aware that numerous changes may be made in certain details of construction of the present invention and in details of the various elements disclosed in the instant application and we therefore do not intend to be limited except as defined by the scope and spirit of the appended claims.

We claim:

1. In a transmission, a main shaft, a gear rotatably journalled thereon, a second gear splined on said shaft and having a portion overlying the hub on the first gear, a countershaft, a gear on said countershaft slidable into driving engagement with said rotatable gear, a coiled spring member lying between the overlying portions of said main shaft gears, means operable to actuate said coils of the spring member to frictionally clutch said gears for conjoint rotation when said rotatable gear tends to overrun said splined gear, shiftable means on said main shaft, and means for actuating said coiled spring member in a reverse direction upon actuation of said shiftable means to clutch said rotatable gear to said splined gear when said shaft overruns said rotatable gear.

2. In combination, in a transmission, a drive gear, a main shaft having one end journalled in said drive gear, a countershaft, gear means on said countershaft driven from said drive gear, a gear rotatably journalled on said main shaft, a gear splined on said main shaft adjacent said rotatable gear, overrunning spring clutch means between said main shaft gears, a countershaft gear shiftable into engagement with said rotatable gear for driving said main shaft through said clutch means at a speed reduction, shiftable means on said main shaft, means for actuating said overrunning spring clutch in a reverse direction upon actuation of said shiftable means to clutch said rotatable gear to said splined gear when said shaft overruns said rotatable gear, a lay shaft, a gear thereon driven from said shiftable countershaft gear when shifted out of engagement with said rotatable gear, and a shiftable lay shaft gear engageable with said splined gear to provide a positive reverse drive to said main shaft.

3. In combination, in a transmission, a main shaft, a gear rotatable thereon having an annular channel, a member splined on said main shaft having an alined annular channel, means for driving said rotatable gear, a coiled friction spring in said channel anchored at one end to said member, means operable upon overrunning said rotatable gear relative to said main shaft for energizing said spring to clutch said rotatable gear to said member, axially shiftable means on said main shaft selectively operable to energize said spring in a reverse direction for clutching said member to said rotatable gear when said shaft overruns said rotatable gear, and a reverse idler engageable with said rotatable gear for reversing the direction of rotation of said main shaft only when said axially shiftable means is actuated.

4. In combination, a transmission main shaft having a gear rotatable thereon, a countershaft including an axially shiftable gear, a lay shaft normally driven from said countershaft gear, said countershaft gear being shiftable to drive said rotatable gear, overrunning clutch means for clutching said rotatable gear to said main shaft, a shiftable gear on said lay shaft operable to move into engagement with said rotatable gear when said countershaft gear is driving said lay shaft to effect reverse drive of said rotatable gear; and means operable to actuate said clutch means in the reverse direction for clutching said rotatable gear under reverse drive to said main shaft.

5. The combination of claim 4 further characterized in the provision of drive gear means for said countershaft journalling one end of said main shaft, and means for clutching said main shaft directly to said drive gear means independently of the position of said countershaft gear but only when said lay shaft gear is in disengaged position.

HARRY R. GREENLEE.
LOREN D. BRITTON.
JOHN R. BOND.